United States Patent
Hänsel et al.

(10) Patent No.: US 11,234,441 B2
(45) Date of Patent: Feb. 1, 2022

(54) USE OF POLYETHER MODIFIED SHORT-CHAIN SILOXANES IN AGRICULTURE IN ORDER TO INCREASE HARVEST YIELD

(71) Applicant: Evonik Operations GmbH, Essen (DE)

(72) Inventors: René Hänsel, Dorsten (DE); Daniela Kruse, Castrop-Rauxel (DE); Ewald Sieverding, St. Johann (DE); Carsten Riedl, Bochum (DE); Jordi Samso Ludwig, L'Escala (ES)

(73) Assignee: Evonik Operations GmbH, Essen (DE)

( * ) Notice: Subject to any disclaimer, the term of this patent is extended or adjusted under 35 U.S.C. 154(b) by 406 days.

(21) Appl. No.: 16/073,091

(22) PCT Filed: Mar. 2, 2017

(86) PCT No.: PCT/EP2017/054894
§ 371 (c)(1),
(2) Date: Jul. 26, 2018

(87) PCT Pub. No.: WO2017/149069
PCT Pub. Date: Sep. 8, 2017

(65) Prior Publication Data
US 2019/0059385 A1    Feb. 28, 2019

(30) Foreign Application Priority Data

Mar. 4, 2016 (EP) .................................... 16158700

(51) Int. Cl.
*A01N 55/00* (2006.01)
*A01N 25/30* (2006.01)
(52) U.S. Cl.
CPC ............. *A01N 55/00* (2013.01); *A01N 25/30* (2013.01)

(58) Field of Classification Search
CPC .................................. A01N 25/30; A01N 55/00
See application file for complete search history.

(56) References Cited

U.S. PATENT DOCUMENTS

| | | | |
|---|---|---|---|
| 2007/0213226 A1* | 9/2007 | Sieverding | A01N 53/00 504/206 |
| 2007/0266750 A1 | 11/2007 | Hollis et al. | |
| 2009/0306147 A1 | 12/2009 | Marczok et al. | |
| 2010/0029587 A1 | 2/2010 | Bruckner et al. | |
| 2010/0105555 A1 | 4/2010 | Sieverding et al. | |
| 2017/0094968 A1 | 4/2017 | Sieverding | |
| 2018/0125067 A1 | 5/2018 | Hansel et al. | |

FOREIGN PATENT DOCUMENTS

| | | | | |
|---|---|---|---|---|
| CN | 101553115 A1 | | 10/2009 | |
| CN | 103651051 | * | 3/2014 | ............. A01C 23/00 |
| DE | 102012010012 A1 | | 11/2012 | |
| EP | 1053678 A1 | | 11/2000 | |
| KR | 10 2009 0075845 A | | 7/2009 | |
| WO | WO 94/22311 | * | 10/1994 | ............. A01N 55/00 |
| WO | WO 2008/037373 | * | 3/2008 | ............. A01N 25/00 |
| WO | 2008/037373 A2 | | 4/2008 | |
| WO | 2008037373 A2 | | 4/2008 | |

OTHER PUBLICATIONS

Joachim Venzmer; Superspreading 20 years of physicochemical research, Current Opinion in Colloid and Interface Science, London, GB, vol. 16, No. 4, Nov. 29, 2010; pp. 335-343.

* cited by examiner

*Primary Examiner* — Anna R Falkowitz
(74) *Attorney, Agent, or Firm* — Taylor English Duma LLP; Philip P. McCann

(57) ABSTRACT

The invention relates to the use of polyether modified short-chain siloxanes in agriculture in order to increase agronomic yield, a method for irrigation, and a kit containing at least one polyether modified short-chain siloxane, and an irrigation system.

18 Claims, 2 Drawing Sheets

USE OF POLYETHER MODIFIED SHORT-CHAIN SILOXANES IN AGRICULTURE IN ORDER TO INCREASE HARVEST YIELD

CROSS REFERENCE TO RELATED APPLICATIONS

This application is a 35 U.S.C. § 371 U.S. national phase entry of International Application No. PCT/EP2017/054894 having an international filing date of Mar. 2, 2017, which claims the benefit of European Application No. 16158700.1 filed Mar. 4, 2016, each of which is incorporated herein by reference in its entirety.

FIELD

Agricultural production rates have been continuously enhanced in the past, for example by means of increased pesticide use or higher fertilizer use per hectare, or by means of more effective irrigation systems. However, these global growth rates have become much smaller over the last two decades. By contrast, global food demand is increasing markedly, and so there is a discrepancy. Reasons for the decrease in global agricultural growth rates are firstly the loss of cultivatable land owing to urbanization, and secondly the decrease in soil fertility. The latter can be attributed to increasing extreme weather conditions such as heavy rain or extreme drought, and to human influences such as over-fertilization and intensive agriculture. This leads to run-off of rainwater, soil erosion, soil nutrient losses and soil salinization, and to lower productivities per hectare overall. (Alexandratos & Bruinsma, "World Agriculture Towards 2030/2050", ESA Working Paper No. 12-03, www.fao.org)

BACKGROUND

One factor which is crucial in determining the productivity per hectare is the penetration of moisture, especially to the root zone. A homogeneous moisture content of the root zone is important for the growth and yield of most plants. This penetration of moisture is determined firstly by the frequency, duration and uniformity of precipitation or irrigation. Therefore, for example, droplet irrigation under some circumstances can lead to distinct increases in yield even compared to conventional irrigation systems. As well as the manner of irrigation, however, penetration of moisture is also dependent on chemical, physical and biological properties of the soil profile. They affect the infiltration and retention of water and aqueous liquids in the soil profile.

Infiltration and retention of water is reduced particularly in hydrophobic soils. Hydrophobic soils are already widespread at temperate latitudes and will spread further in the course of climate change. At particular risk are sandy soils beneath coniferous forest, deciduous forest and grass. Therefore, the increase in the infiltration and retention of water by addition of wetting agents has been studied in the past particularly for hydrophobic soils. In hydrophobic soils, plant growth is highly restricted in some cases, since the surface chemistry of the soils opposes hydration. Over the course of decades, anionic wetting agents such as soaps or mild detergents have been utilized in order to improve water infiltration in hydrophobic soils. However, many of these substances are phytotoxic and can have an unfavourable effect on soil structure (US2015/045225). In intensively utilized areas, but also in the field of hydrophobic plant substrates, nonionic wetting agents such as alkoxylated polyols, glucoethers, ethoxylated and/or propoxylated and/or aromatic alcohols/C8-C22 fatty alcohols, alkyl polyglycosides, for example anionic carboxylic esters of alkyl polyglycosides, alkylated polyglycoside ether carboxylates, alkylated polyglycoside phosphates, betaines, sulphates, alkylated sulphosuccinates, sulphonates, oils having high terpene concentration, terpene alkoxylates or else nonionic alkylene oxide (block) copolymers are used (WO 2013110552).

SUMMARY

Trisiloxane surfactants have the general structure Me3SiO—SiMeR—OSiMe3 where the R radical is a polyether radical. The predominant use of trisiloxane surfactants, for example BREAK-THRU® S-240, Evonik Industries AG, is the employment thereof in crop protection. They lower the static surface tension of water to a significantly greater degree than the abovementioned products. The term "surface tension" is understood in the prior art to mean static surface tension. For example, in the case of trisiloxanes, static surface tension at a dosage of 0.05 percent by weight in water is about 20 to 25 mN/m.

In addition to use of wetting agents in the field of irrigation of green areas, wetting agents are also used much less commonly in the irrigation of areas in agricultural use. The focus of wetting agent applications in the agricultural sector is especially in the field of crop protection (US2014/0242197), but also in better moisture penetration to the root zone (CA2769988), in general improvement of plant health and in better plant and/or root growth (US2010/0144534, AU2013201540), in better plant survival and in enhanced microbial activity in the soil. In these applications, use amounts between 5 and 100 l/ha are described, preferably 10 to 20 l/ha (AU2013201540).

In practice, irrigation additives are often added to a tank containing water or else nutrient solutions and distributed in the irrigation or fertilizer solution with gentle stirring, in order to be able to distribute the desired amount of wetting agent over the intended field areas by means of the micro-irrigation systems. The adjuvants here are either incorporated into the nutrient formulation prior to the tankmixing operation or added to the nutrient solution/liquor as separate tankmix additives. Micro-irrigation systems are either low- or medium-pressure systems which supply water in the form of spray, mist, sprinkling or droplets. This is done using various technical water outlets such as micro-sprayers, nebulizers, atomizers, micro- and mini-irrigators, drippers, irrigation hoses and others. Through the choice of dripper, it is possible to adjust the emission rate in a plant-specific manner, since many plants utilized in an agricultural and horticultural setting have very different demands on water supply. Micro-irrigation systems consist of tubes, hoses, water-emitting devices, flow regulation systems, installation units, connections and further accessories. Sprinkler systems are globally the most common irrigation systems, droplet irrigation being advantageous particularly in regions where water is scarce.

DETAILED DESCRIPTION

In order to be able to assess the agricultural potential and the activities of substances, in addition to laboratory and greenhouse experiments, preference is given to realistic applications in agriculture in the form of field trials for example.

Disadvantages of the prior art are that conventionally utilized wetting agents have been tested to a particular degree on hydrophobic soils only, and the amounts thereof used in agriculture are very large, and so the utilization thereof is laborious and costly to the farmer. Polyether-modified short-chain siloxanes, especially trisiloxanes, have not been used to date in agricultural irrigation for increasing the agronomic yield. Because of the rising global demand for food and the limited area for agriculture, ever more value is being placed on a rising hectare-based increase in yield.

"Readily biodegradable" within the scope of the present invention describes degradability according to OECD Method 301F CD, preferably as described in EP15172382A (filed 16 Jun. 2015).

The word "soil" within the scope of the present invention is understood to mean not just naturally occurring soils such as topsoil or loam, but also any substrate which is used for plant growth.

It was an object of the present invention to overcome at least one disadvantage of the state of the art.

It has been found that, surprisingly, the addition of polyether-modified short-chain siloxanes to the water used for irrigation of plants can distinctly increase agronomic yield at very low application volumes in various agriculturally utilized soils.

The subjects of the invention are described by way of example hereinafter, without any intention that the invention be restricted to these illustrative embodiments. When ranges, general formulae or compound classes are specified hereinbelow, these shall encompass not just the corresponding ranges or groups of compounds that are explicitly mentioned but also all subranges and subgroups of compounds obtainable by extracting individual values (ranges) or compounds. When documents are cited in the context of the present description, the contents thereof, particularly with regard to the subject-matter that forms the context in which the document has been cited, are considered in their entirety to form part of the disclosure-content of the present invention. Unless stated otherwise, percentages are figures in percent by weight. When average values are reported hereinbelow, the values in question are weight averages, unless stated otherwise. When parameters which have been determined by measurement are reported hereinafter, they have been determined at a temperature of 25° C. and a pressure of 101.325 Pa, unless stated otherwise.

The present invention provides for the use of polyether-modified short-chain siloxanes of formula (I)

$$M_a D_b D'_c \quad \text{Formula (I)}$$

with $M=R^1_3SiO_{1/2}$, $D=R^1_2SiO_{2/2}$, $D'=R^1R^2SiO_{2/2}$,
where
a is 2,
b is 0 to 0.5, preferably 0 to 0.1, especially preferably 0,
c is 1 to 3, preferably 1 to 2, more preferably 1.0 to 1.15, even more preferably 1.0 to 1.10, especially preferably 1.0 to 1.05,
$R^1$ are independently hydrocarbyl having 1 to 8 carbon atoms, preferably methyl, ethyl, propyl or phenyl radicals, especially preferably methyl radicals,
$R^2$ is independently a polyether radical of the formula (II)

$$—R^3O[CH_2CH_2O]_m[CH_2CH(CH_3)O]_nR^5 \quad \text{Formula (II)}$$

where
m=2 to 30, preferably 2 to 20, more preferably 3.4 to 11.0, even more preferably 3.6 to 9.9, particularly preferably 4.5 to 8.5, n=0 to 10, preferably 2.5 to 8.0, more preferably 2.7 to 7.5, particularly preferably 3.0 to 6.0,
but with the provisos that:
$R^3$ are independently divalent hydrocarbyl radicals having 2 to 8 carbon atoms, preferably ethylene, propylene, 1-methylpropylene, 1,1-dimethylpropylene radical, especially preferably —$CH_2CH_2CH_2$—,
$R^5$ are each independently hydrocarbyl radicals having 1 to 16 carbon atoms or hydrogen, preferably hydrogen or methyl,
and, if n is greater than 0,
m/n=1 to 30, preferably 1.5 to 15, more preferably 1.8 to 5, especially preferably 1.9 to 2.8, and
for all values of n claimed, if c is greater than or equal to 1.2,
c*(m+n)=12 to 50, preferably 13 to 40, more preferably 14 to 25, for increasing agronomic yield.

The use of the polyether-modified short-chain siloxanes of the formula (I) is restricted to application in the root region.

Preferably, the polyether-modified short-chain siloxanes of the formula (I) are used exclusively in irrigation, more preferably together with the irrigation water. It is especially preferable that there is no application of the polyether-modified short-chain siloxanes of the formula (I) to or on the leaves.

The agronomic yield in the context of the present invention is linked directly to the agronomic aim and preferably means that the yield is enhanced. Such increases in yield may be based on the mass of the plant or parts thereof, and also on the number of parts of the plant.

The compounds of the formula (II) may have a statistical structure. Statistical distributions are formed in blocks with any number of blocks and any sequence, or are subject to a randomized distribution; they may also have an alternating structure or else form a gradient over the chain; more particularly, they may also form all mixed forms in which groups of different distributions may optionally follow one another. Specific executions may have the result that the statistical distributions experience restrictions as a result of the execution. For all areas that are unaffected by the restriction, there is no change in the statistical distribution.

The index numbers shown in the formulae (I) and (II) mentioned here and the ranges of values for the indices specified should be regarded as mean values of the possible statistical distribution of the structures actually present and/or mixtures thereof. This also applies to structural formulae that have in themselves been reproduced exactly as such.

The inventive use of the polyethers of the formula (I) has the advantage of the possible extension of the harvesting period, as a result of which the increase in yield claimed can be increased still further.

Further preferably, the short-chain siloxanes of the formula (I) which have been polyether-modified according to the use are for the indices of formula (II), m preferably 5 to 15, more preferably 8 to 12, and n preferably 1 to 6, more preferably 2 to 5.

Preferably, the polyether radical, calculated without $R^3O$ and calculated without $R^5$, has a molar mass M (PE) calculated by 44 g/mol*m+58 g/mol*n where the indices m and n relate to formula (II).

The preferred values of M (PE) are: lower limits M (PE) greater than 520 g/mol, preferably greater than 530 g/mol, more preferably greater than 535 g/mol; upper limit M (PE) less than 660 g/mol, preferably less than 630 g/mol, more preferably less than 600 g/mol.

Preferably, the value of M (PE) is greater than 520 g/mol and less than 660 g/mol, especially greater than 535 g/mol and less than 600 g/mol.

If c is equal to 1 to less than 1.2 in formula (I), it is preferable that the sum total of m+n is preferably greater than 9 up to 19, more preferably greater than 9.5 up to 15 and especially preferably greater than 10 up to 12.

More preferably, $R^5$ is hydrogen and the value of M (PE) is greater than 520 g/mol and less than 660 g/mol; especially preferably, $R^5$ is hydrogen and the value of M (PE) is greater than 535 g/mol and less than 600 g/mol.

More preferably, the polyether-modified short-chain siloxanes of the formula (I) have an index c between 1 and 1.05, where the indices of the polyether radical of formula (II) are m from 3.4 to 11.0 and n from 2.5 to 8.0.

More preferably, the polyether-modified short-chain siloxanes of the formula (I) have an index c between 1 and 1.05, where the ratio m/n is 0.8 to 2.8, especially 1.9 to 2.8.

Especially preferably, the polyether-modified short-chain siloxanes of the formula (I) have an index c between 1 and 1.05, where the molar mass of the polyether radical M(PE) is greater than 520 g/mol and less than 660 g/mol.

Especially preferably, the polyether-modified short-chain siloxanes of the formula (I) have an index c between 1 and 1.05, where the $R^5$ radical is hydrogen.

Especially preferably, the polyether-modified short-chain siloxanes of the formula (I) have an index c between 1 and 1.05, where the molar mass of the polyether radical M(PE) is greater than 520 g/mol and less than 660 g/mol and the $R^5$ radical is hydrogen.

Preferably, no further polyether-modified short-chain siloxanes apart from those of formula (I) are used in accordance with the invention.

Biodegradability is preferably determined by the OECD 301 F method. More preferably, biodegradability is determined in accordance with OECD 301 F after 28 d at 22° C. Especially preferably, biodegradability is determined as described in EP3106033A1, especially in the examples therein.

Preferably, the polyether-modified short-chain siloxanes of formula (I) have a biodegradability of greater than 60%, more preferably of greater than or equal to 63% and especially preferably of greater than or equal to 65%, the maximum value being 100%.

Particular polyether-modified short-chain siloxanes of the formula (I), according to OECD 301 F, meet the conditions of ready biodegradability. This criterion is met when more than 60% of the product has been biodegraded after 28 days. These compositions which meet the OECD 301 F conditions are described as follows.

Preferably, the inventive compositions include the polyether-modified siloxanes of the formula (I) where the index d is 1.0 to 1.05 and biodegradability of these siloxanes is greater than 60%.

More preferably, the polyether-modified short-chain siloxanes of the formula (I) have a biodegradability of greater than 60%, and the index c is additionally between 1 and 1.05, where the molar mass of the polyether radical M(PE) is greater than 520 g/mol and less than 660 g/mol and the $R^5$ radical is hydrogen.

More preferably, the polyether-modified short-chain siloxanes of the formula (I) have a biodegradability of greater than 60%, and the index c is additionally between 1 and 1.05, where the molar mass of the polyether radical M(PE) is greater than 520 g/mol and less than 660 g/mol, the $R^5$ radical is hydrogen.

The polyether-modified short-chain siloxanes of the formula (I) are prepared by hydrosilylation reaction according to the prior art. For preparation of the polyether-modified short-chain siloxanes of the formula (I) in which the index c is 1.0 to 1.15, the process according to the invention of EP3106033A1 and its analogous possible executions is utilized with use of suitable polyethers.

Preference is further given to the inventive use of polyether-modified short-chain siloxanes of the formula (I) in irrigation in agriculture.

Preference is further given to the inventive use of polyether-modified short-chain siloxanes of the formula (I) for reducing the variability of harvest outcomes and stabilization at a higher level compared to identical irrigation without use of polyether-modified short-chain siloxanes of the formula (I).

Within the scope of the present invention, variability of harvest outcomes is understood to mean that the agronomic yields vary from vegetation period to vegetation period under otherwise comparable conditions without the inventive use. Stabilization of harvest results means that the average yield in one and the same area of different vegetation periods increases in the case of the inventive use; preferably, the agronomic yield increases by at least 3%, more preferably by at least 5% and especially preferably by at least 7%.

Preference is further given to the inventive use of polyether-modified short-chain siloxanes of the formula (I) according to any of claims 1 to 3, wherein an amount of 0.25 to 100 l/ha is used with the irrigation, preferably 0.75 to 20 l/ha, especially preferably 1 to 12 l/ha.

Preference is further given to the inventive use of polyether-modified short-chain siloxanes of the formula (I), wherein the agricultural crops are implemented on any soils, preferably humus-containing, sandy, clay-containing or loam-containing soils and plant substrates.

Preference is further given to the inventive use of polyether-modified short-chain siloxanes of the formula (I), wherein annual, biannual, multiannual or perennial plants are cultivated.

Preferred agricultural fields of use are arable farming, growing of garden and ornamental plants, and viticulture. Particular preference is given to fruit and vegetable growing. Preferred fruit is pome fruit, stone fruit, berry fruit and shelled fruit. Preferred vegetables are root vegetables, shoot vegetables, tuber vegetables, onion-type vegetables, leafstalk vegetables, leaf vegetables, leaf lettuces, seed vegetables and fruit vegetables.

The present invention further provides a method of increasing agronomic yield by adding polyether-modified short-chain siloxanes of the formula (I) to the irrigation system in a periodic manner.

Preference is given to a method according to the invention wherein the application of polyether-modified short-chain siloxanes of the formula (I) is non-continuous.

Preference is given to a method according to the invention wherein the application of polyether-modified short-chain siloxanes of the formula (I) is effected repeatedly at an interval of 7 to 14 days, more preferably at an interval of 9 to 12 days.

Preference is given to a method according to the invention wherein the application of polyether-modified short-chain siloxanes of the formula (I) is effected in a total amount of 0.25 to 100 l/ha with the irrigation, preferably 0.75 to 20 l/ha, especially preferably 1 to 12 l/ha.

More preferably, the application is effected periodically by adding the polyether-modified short-chain siloxanes to the irrigation water, wherein the polyether-modified short-chain siloxanes are applied to the plants within 6 hours, more preferably within 4 hours, particularly preferably within 2 hours.

Preference is given to a method according to the invention wherein the application of polyether-modified short-chain siloxanes of the formula (I) is effected repeatedly at an interval of 7 to 14 days and in a total amount of 1 to 12 l/ha.

The application of the polyether-modified short-chain siloxanes is preferably conducted together with further additives such as nutrients or soil auxiliaries. Preferred nutrients are NPK fertilizers or NPK-containing fertilizers, especially fertilizers containing further trace elements in addition to NPK. Preferred soil auxiliaries are cation exchangers, additives for pH regulation, or else useful bacteria.

More preferably, the application of the polyether-modified short-chain siloxanes is not effected together with herbicides, fungicides, nematicides and insecticides.

Preferably, the irrigation systems are selected from micro-irrigation systems, especially sprinkler and drip systems.

The present invention further provides a kit comprising an irrigation system, water and at least one polyether-modified short-chain siloxane of the formula (I).

Preference is given to a kit according to the invention wherein the polyether-modified short-chain siloxane of the formula (I) is biodegradable.

Preferably, the polyether-modified short-chain siloxanes of formula (I) have a biodegradability of greater than 60%, more preferably of greater than or equal to 63% and especially preferably of greater than or equal to 65%, the maximum value being 100%.

More preferred is a kit according to the invention wherein the irrigation system is a micro-irrigation system and the polyether-modified short-chain siloxane of the formula (I) has a biodegradability of more than 60%. Further more preferably, the kit does not contain any pesticides such as herbicides, fungicides, nematicides and insecticides.

The results show that the inventive application of a polyether-modified short-chain siloxane of the formula (I) brings about a distinct increase in agronomic yield compared to the comparable noninventive irrigation without polyether-modified short-chain siloxane of the formula (I).

Surprisingly, the increase in agronomic yield was not manifested exclusively in an increase in fruit size, but also in an increase in the flowers and number of fruits.

The advantages of the use were examined in tomatoes and lettuce and are also observed in peppers, strawberries, kiwi fruit and citrus fruits.

Particularly agriculturally sensitive and difficult crops, for example tomatoes, profit from the employment of the short-chain siloxanes which have been polyether-modified according to the use.

EXAMPLES

Figure 1:
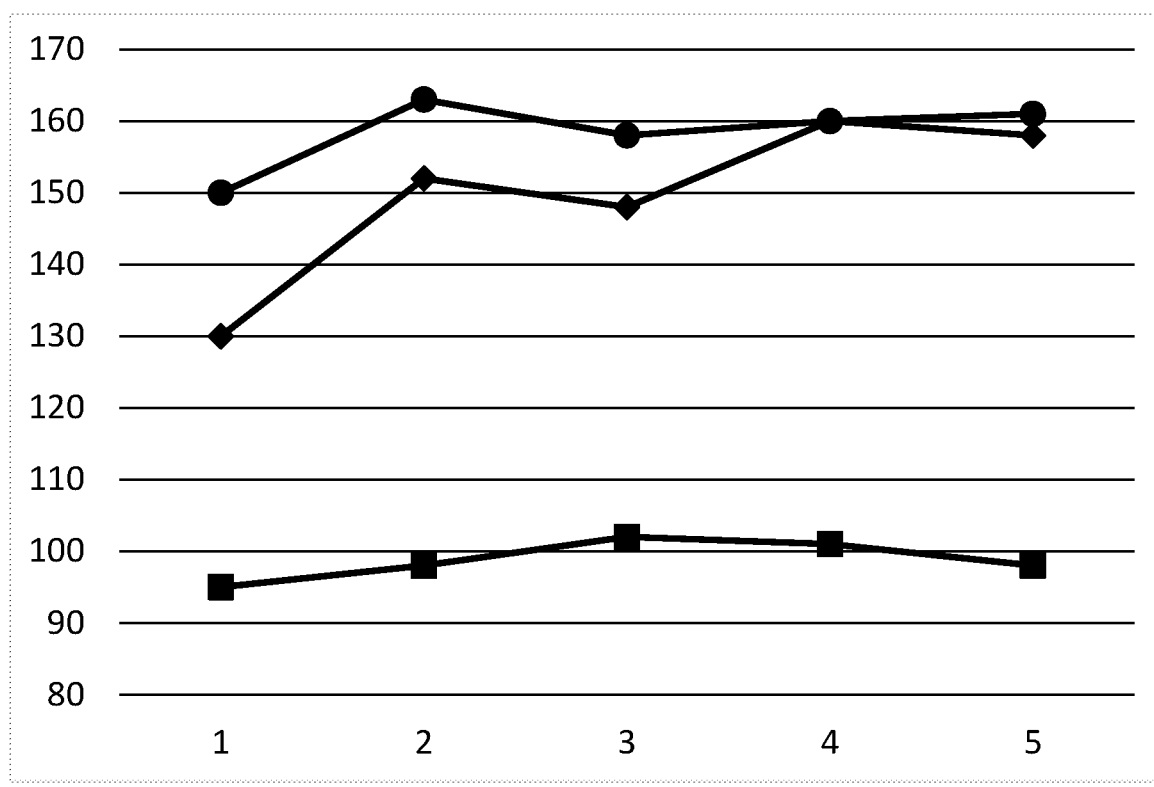
FIG. 1 shows the number of flowers in fields A (squares), B (diamonds) and P (circles) across the batches according to Table 1.

General Methods and Materials:

| Compound | Product description |
|---|---|
| PES 1 | M (PE) = 565 g/mol, $R^5$ = hydrogen; index c of the formula (I) = 1.13 |
| PES 2 | M (PE) = 580 g/mol, $R^5$ = hydrogen; index c of the formula (I) = 1.01 |

Field Trials to Ascertain the Increase in Agronomic Yield

The test system chosen for the increase in yield was the growing of tomatoes. Tomatoes are complicated to grow, since they are susceptible to various effects during growth. An increase in yield in this high-value segment is therefore particularly desirable.

Outdoor Trial

The open-air field trials were conducted at three sites under comparable meteorological conditions with two different soil types. One soil type was a heavy soil type consisting predominantly of clay (fields A and B) which is prone to waterlogging, and the other was a loose soil also consisting predominantly of clay (field P). Tomatoes were planted with a plant density of about 31 000 plants per hectare, a distance between the plants in a line of 0.35 m, a distance of 0.4 m in the twin lines and a distance between the twin rows of 1.8 m. The irrigation, fertilization and applications of the test substances were effected by droplet irrigation at 1.6 l/h with an outlet every 40 cm. The applications were effected 10 days/20 days/37 days/47 days and 57 days after the seedlings had been planted. The application frequency and volumes were varied such that the final amounts were between 3 and 10 l/ha. Four months after the planting, the tomatoes were harvested. The following data were determined in order to determine the harvest and the effect of the product: the number of flowers per plant and the number and weight of red and green tomatoes.

Each of the three trials consisted of 5 batches, one of which was the control where the plants did not receive the application. Each batch consisted of 20 plants (10 plants×2).

TABLE 1

Definition of the batches, test substance PES 1

| Batch | Number | Application days | Amount per application |
|---|---|---|---|
| 1 | 0 | none | |
| 2 | 3 | day 10, day 37, day 57 | 1 l/ha |
| 3 | 5 | day 10, day 20, day 37, day 47, day 57 | 1 l/ha |
| 4 | 3 | day 10, day 37, day 57 | 2 l/ha |
| 5 | 5 | day 10, day 20, day 37, day 47, day 57 | 2 l/ha |

The agronomic yields were determined for each of the five trial batches per trial. The averages of the two repeats in each case were calculated and documented.

TABLE 2

Yields from fields A, B and P with batches 1 to 5 of Table 1, mass in kg

| Batch | Number 1 | Mass | Number 2 | Mass | Number 3 | Mass | Number 4 | Mass | Number 5 | Mass |
|---|---|---|---|---|---|---|---|---|---|---|
| Field A | | | | | | | | | | |
| Flowers | 95 | | 98 | | 102 | | 101 | | 98 | |
| Red fruit | 40 | 2.95 | 43 | 3.83 | 42 | 3.88 | 42 | 3.85 | 41 | 3.95 |
| Green fruit | 4 | 0.13 | 6 | 0.41 | 5 | 0.36 | 5 | 0.408 | 5 | 0.42 |
| Field B | | | | | | | | | | |
| Flowers | 130 | | 152 | | 148 | | 160 | | 158 | |
| Red fruit | 50 | 4.6 | 58 | 5.2 | 57 | 5.08 | 57 | 5.01 | 58 | 5.8 |
| Green fruit | 5 | 0.23 | 10 | 0.65 | 8 | 0.6 | 9 | 0.71 | 10 | 0.52 |
| Field P | | | | | | | | | | |
| Flowers | 150 | | 163 | | 158 | | 160 | | 161 | |
| Red fruit | 50 | 4.8 | 54 | 5.45 | 53 | 5.5 | 55 | 5.01 | 54 | 5.25 |
| Green fruit | 12 | 1.08 | 15 | 1.25 | 14 | 1.23 | 15 | 1.2 | 15 | 1.15 |

Field A and field B differ in the intensity of soil cultivation prior to the setting of the plants.

Field A was a soil that had only been superficially loosened in the region of roughly 5 cm, while field B had been intensively cultivated down to a depth of about 20 cm.

FIG. 1 shows a dose effect in the number of flowers in field B. In this case, for the triple treatment with 2 l/ha, the most flowers were counted. The average rise in the number of flowers in all three fields is 10%. The increase in the number of flowers indicates a possible extension of the harvest period, as a result of which it was possible to increase the rise in yield shown below even further.

In the determination of agronomic yield via the number and weight of the fruits, it was not possible to observe any dose effect. Therefore, the effects of all applications were combined and presented. Use of a total of 3 l/ha in this example was sufficient to achieve a distinct increase in yield.

Figure 2:
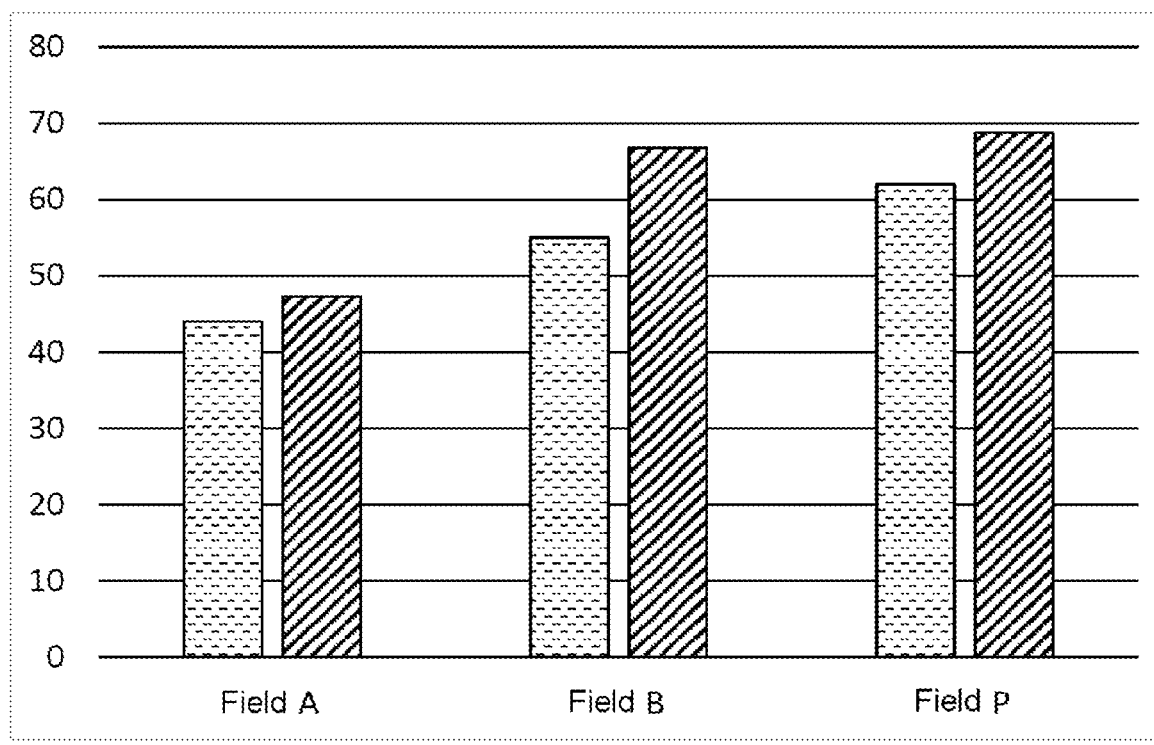
FIG. 2 shows the graph of the values from Table 2, the average number of fruits (red+green).

FIG. 2 shows the average values from Table 2 (number of fruits, red+green), with the dashed bar representing the control and the diagonal striped bar according to the use. On average, the number of fruits harvested from the plants treated with PES 1 was 13% higher than the number of fruits harvested from the control plants without treatment.

Figure 3:
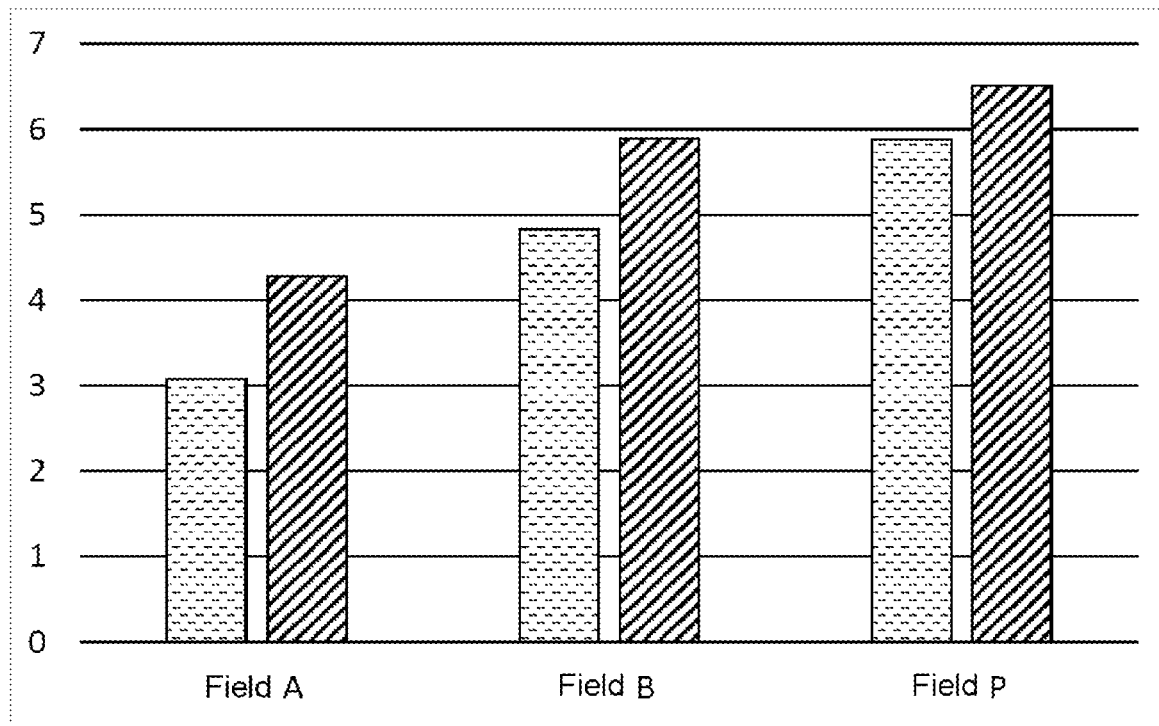
FIG. 3 shows the graph of the values from Table 2, the average mass of the fruits in kg (red+green).

FIG. 3 shows that the average weight of fruits harvested (red+green) from the plants treated with PES 1 was 24% higher on average than that of the fruits from the control plants.

Greenhouse Trial

In a greenhouse, tomatoes of the Cherokee variety were grown in a soil that consisted of 78% sand, 16% loam and 6% clay.

The plant density was about 25 000 plants per hectare, planted a distance between the plants in a line of 0.4 m, a distance of 0.8 m in the twin lines, and a distance between the twin lines of 2 m.

The watering, fertilization and applications of the test substances were affected by droplet watering at 1 l/h with an outlet every 15 cm. The application was effected once on the 10th day after the planting of the seedlings. The amounts corresponded to 1 l/ha. 17 weeks after planting, the tomatoes were harvested. The number and weight of the tomatoes were determined, in order to determine the harvest and the effect of the products.

Each of the three trials consisted of 4 batches, with each batch consisting of 14 plants (7 plants×2). PES 1 and PES 2 were applied, and all batches including the control were treated identically, for example in relation to applications of fertilizer.

TABLE 3

Fruit yields after application of PES 1 and PES 2, average values from 4 plots

| | Number | Total mass [g] | Individual fruit mass [g] |
|---|---|---|---|
| Control | 17 | 1777 | 101.2 |
| PES 1 | 24.5 | 2412 | 100.6 |
| PES 2 | 26.8 | 2880 | 108.4 |

The experiment shows the advantageous use of the polyether-modified short-chain siloxanes of formula (I) according to the use.

The invention claimed is:

1. A method of increasing agronomic yield comprising the steps of adding polyether-modified short-chain siloxanes of the formula (I) to an irrigation system comprising water and fertilizer, wherein the polyether-modified short-chain siloxanes of formula (I)

$$M_a D_b D'_c \qquad \text{Formula (I)}$$

with $M=R^1_3SiO_{1/2}$, $D=R^1_2SiO_{2/2}$, $D'=R^1R^2SiO_{2/2}$, where a is 2, b is from 0 to 0.5, c is from 1 to 3, $R^1$ is independently hydrocarbyl having from 1 to 8 carbon atoms, $R^2$ is independently a polyether radical of the formula (II)

$$-R^3O[CH_2CH_2O]_m[CH_2CH(CH_3)O]_nR^5 \qquad \text{Formula (II)}$$

where m=from 2 to 30, n=from 0 to 10, wherein $R^3$ are independently divalent hydrocarbyl radicals having 2 to 8 carbon atoms, $R^5$ is independently a hydrocarbyl radical having from 1 to 16 carbon atoms or hydrogen, and, if n is greater than 0, m/n=is from 1 to 30 and for all values of n claimed, if c is greater than or equal to 1.2, $c*(m+n)$=from 12 to 50, and in the root region for increasing agronomic yield, wherein the method is free of herbicides, fungicides, nematicides and insecticides.

2. The method according to claim 1 used in agriculture, wherein the polyether radical of the formula (II) has a molar mass from 530 g/mol to 630 g/mol.

3. The method according to claim 1 for reducing the variability of harvest outcomes and stabilization at a higher level compared to identical irrigation without use of polyether-modified short-chain siloxanes of the formula (I), and the polyether radical of the formula (II) has a molar mass from 535 g/mol to 600 g/mol.

4. The method according to claim 1, wherein an amount of from 0.25 to 100 l/ha is used with the irrigation.

5. The method according to claim 1, wherein the agricultural crops are implemented on any soils.

6. The method according to claim 1, wherein annual, biannual, multiannual or perennial plants are cultivated.

7. The method according to claim 1, wherein the kit-further comprises adjuvants.

8. The method according to claim 1, wherein
b is 0 to 0.1,
c is 1 to 2,
$R^1$ is selected from the group consisting of methyl, ethyl, propyl or phenyl radicals.

9. The method of increasing agronomic yield by adding polyether-modified short-chain siloxanes of the formula (I) according to claim 1 to the irrigation system in a periodic manner wherein the application of polyether-modified short-chain siloxanes of the formula (I) is effected repeatedly at an interval of from 7 to 14 days.

10. The method according to claim 9, wherein the method of polyether-modified short-chain siloxanes of the formula (I) is non-continuous.

11. The method according to claim 9, wherein the method of polyether-modified short-chain siloxanes of the formula (I) is effected repeatedly at an interval of from 9 to 12 days.

12. The method according to claim 9, wherein the irrigation systems are selected from micro-irrigation systems.

13. The method according to claim 1, wherein an amount of from 0.75 to 20 l/ha is used with the irrigation.

14. The method according to claim 1, wherein an amount of from 1 to 12 l/ha is used with the irrigation.

15. The method according to claim 1, wherein the agricultural crops are implemented on humus-containing, sandy, clay-containing or loam-containing soils or substrates.

16. The method according to claim 1, wherein
b is 0 to 0.1,
c is 1 to 2,
$R^1$ is selected from the group consisting of methyl, ethyl, propyl or phenyl radicals,
$R^2$ is independently a polyether radical of the formula (II)

$$—R^3O[CH_2CH_2O]_m[CH_2CH(CH_3)O]_nR^5 \qquad \text{Formula (II)}$$

where
m=2 to 20,
n=2.5 to 8,
wherein:
$R^3$ is selected from the group consisting of ethylene, propylene, 1-methylpropylene, and 1,1-dimethylpropylene radical,
$R^5$ is hydrogen or methyl,
and, if n is greater than 0,
m/n=is 1.5 to 15 and
for all values of n claimed, if c is greater than or equal to 1.2,
$c*(m+n)$=13 to 40,
in the root region for increasing agronomic yield.

17. The method according to claim 1, wherein
b is 0,
c is from 1.0 to 1.10,
$R^1$ is a methyl radical,
$R^2$ is independently a polyether radical of the formula (II)

$$—R^3O[CH_2CH_2O]_m[CH_2CH(CH_3)O]_nR^5 \qquad \text{Formula (II)}$$

where
m=4.5 to 8.5,
n=3.0 to 6.08,
wherein:
$R^3$ is —$CH_2CH_2CH_2$—,
$R^5$ is hydrogen or methyl,
and, if n is greater than 0,
m/n=is 1.9 to 2.8 and
for all values of n claimed, if c is greater than or equal to 1.2,
$c*(m+n)$=14 to 25,
in the root region for increasing agronomic yield.

18. The method according to claim 1, wherein
b is 0,
c is from 1.0 to 1.05,
$R^1$ is a methyl radical,
$R^2$ is independently a polyether radical of the formula (II)

$$—R^3O[CH_2CH_2O]_m[CH_2CH(CH_3)O]_nR^5 \qquad \text{Formula (II)}$$

where
m=3.6 to 9.9,
n=3.0 to 6.08,
wherein:
$R^3$ is —$CH_2CH_2CH_2$—,
$R^5$ is hydrogen or methyl,
and, if n is greater than 0,
m/n=is 1.8 to 5 and
for all values of n claimed, if c is greater than or equal to 1.2,
$c*(m+n)$=14 to 25,
in the root region for increasing agronomic yield.

* * * * *